(12) United States Patent
Odell et al.

(10) Patent No.: US 8,697,194 B2
(45) Date of Patent: *Apr. 15, 2014

(54) CURABLE OVERCOAT COMPOSITIONS

(75) Inventors: Peter G. Odell, Mississauga (CA);
Jennifer L. Belelie, Oakville (CA);
Michelle N. Chretien, Mississauga
(CA); Gordon Sisler, St. Catharines
(CA); Christopher A. Wagner,
Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 983 days.

This patent is subject to a terminal disclaimer.

(21) Appl. No.: 12/100,672

(22) Filed: Apr. 10, 2008

(65) Prior Publication Data
US 2009/0258155 A1 Oct. 15, 2009

(51) Int. Cl.
| | |
|---|---|
| *C08F 2/50* | (2006.01) |
| *C08F 4/00* | (2006.01) |
| *G01D 11/00* | (2006.01) |
| *B41J 2/01* | (2006.01) |
| *C07C 233/00* | (2006.01) |
| *C07C 235/00* | (2006.01) |
| *C07C 237/00* | (2006.01) |
| *C07C 51/50* | (2006.01) |
| *C11B 5/00* | (2006.01) |
| *C07C 231/00* | (2006.01) |
| *C11C 3/00* | (2006.01) |

(52) U.S. Cl.
USPC ........... 427/517; 427/519; 347/100; 347/101; 347/102; 347/105; 554/7; 554/37; 564/152

(58) Field of Classification Search
USPC .......... 427/517, 519; 347/100, 101, 102, 105; 554/7, 37; 564/152
See application file for complete search history.

(56) References Cited

U.S. PATENT DOCUMENTS

| | | | | |
|---|---|---|---|---|
| 3,711,437 | A * | 1/1973 | Schroeder et al. | 524/747 |
| 7,272,614 | B2 * | 9/2007 | Kraft | 1/1 |
| 7,279,506 | B2 | 10/2007 | Sisler et al. | |
| 7,279,587 | B2 | 10/2007 | Odell et al. | |
| 7,632,546 | B2 * | 12/2009 | Odell et al. | 427/466 |
| 2004/0065227 | A1 * | 4/2004 | Breton et al. | 106/31.29 |
| 2005/0072519 | A1 * | 4/2005 | Johnson et al. | 156/275.5 |
| 2007/0119340 | A1 * | 5/2007 | P. Breton et al. | 106/31.43 |
| 2007/0120910 | A1 | 5/2007 | Odell et al. | |
| 2007/0120921 | A1 | 5/2007 | Carlini et al. | |
| 2007/0120924 | A1 | 5/2007 | Odell et al. | |
| 2007/0142492 | A1 * | 6/2007 | Odell et al. | 522/74 |
| 2008/0000384 | A1 | 1/2008 | Belelie et al. | |

FOREIGN PATENT DOCUMENTS

| | | | |
|---|---|---|---|
| EP | 2 028 240 A1 | 2/2009 | |
| JP | A-2005-329713 | 12/2005 | |
| WO | WO0129093 | * 4/2001 | ................ C08F 2/50 |

OTHER PUBLICATIONS

Clariant Product Anouncement Innovative Wax for UV-Cured Paint Systems May 23, 2002 {http://www.specialchem4coatings.com/news-trends/displaynews.aspx?id=523}.*
U.S. Appl. No. 12/023,979, filed Jan. 31, 2008 in the name of Kovacs et al.
Canadian Office Action in Canadian Patent Application No. 2,661,303 mailed Sep. 27, 2010.
Canadian Office Action in Canadian Patent Application No. 2,661,303 mailed Apr. 15, 2011.
Canadian Office Action dated Mar. 28, 2013 from Canadian Patent Application No. 2,661,303.
Chinese Office Action dated Jun. 11, 2012 from Chinese Patent Application No. 200910117900.3 (with translation).

* cited by examiner

*Primary Examiner* — Patrick Ryan
*Assistant Examiner* — Aaron Greso
(74) *Attorney, Agent, or Firm* — Oliff PLC

(57) ABSTRACT

A substantially colorless radiation overcoat composition suitable for overcoating ink-based images and xerographic-based images. The overcoat composition comprises at least one gellant, at least one monomer, at least one substantially non-yellowing photoinitiator, optionally a curable wax, and optionally a surfactant.

24 Claims, No Drawings

CURABLE OVERCOAT COMPOSITIONS

BACKGROUND

Described herein is a substantially colorless radiation curable overcoat composition that may be used for overcoating, for example, ink based images and xerographic based images. The overcoat composition described herein comprises at least one gellant, at least one monomer, at least one photoinitiator, optionally a curable wax, and optionally a surfactant, and is substantially free of colorants. Also described is a method for applying the overcoat composition to a substrate, for example a substrate that includes printed images thereon.

Wax based inks, sometimes known as phase change inks, are used to form digital images on paper using heated piezoelectric or acoustic ink jet heads. The ejection of an ink drop by the print heads is electronically controlled. In embodiments, the hot drop partially cools upon hitting an intermediate surface, often an aluminum drum. The complete image is assembled on the intermediate surface and then transferred to paper and fixed thereon with a combination of pressure and heat resulting in a solid ink, or wax-based ink print. Alternatively, the wax-based image can be printed directly to the substrate. The direct-to-paper image is also exposed to a combination of pressure and heat to fix the image to the substrate.

In conventional xerography, electrostatic latent images are formed on a xerographic surface by uniformly charging a charge retentive surface, such as a photoreceptor. The charged area is then selectively dissipated in a pattern of activating radiation corresponding to the original image. The latent charge pattern remaining on the surface corresponds to the area not exposed to radiation. Next, the latent charge pattern is visualized by passing the photoreceptor past one or more developer housings comprising toner, which adheres to the charge pattern by electrostatic attraction. The developed image is then fixed to the imaging surface or is transferred to a receiving substrate, such as paper, to which it is fixed by a suitable fusing technique, resulting in a xerographic print or toner-based print. To enable successful fusing with complete retention of the image on paper, in other words without offset of the image onto the fuser role, release enabling additives are incorporated in the process. Conventionally this release additive has been a silicone oil based fuser oil, more recently in some printer designs the complexity of handling fuser oil has been eliminated. This technological advance has been accomplished by incorporating wax into the toner particle. In both cases the fused image is left with a surface layer of either silicone oil or wax. Both surfaces can be difficult to subsequently coat.

Known methods of protecting toner-based images include applying an overcoat composition to the substrate. The overcoat composition is typically a liquid film coating that may be dried and/or cured. Curing may be accomplished through drying or heating or by applying ultraviolet light or low voltage electron beams to polymerize (crosslink) the components of the overcoat. However, known overcoat compositions fail to adequately protect toner-based prints and do not possess the requisite properties for controlled application, such as, for example, by an ink jet printer.

Typically, known overcoating formulations are applied using a liquid film coating device, and thus are often applied over the entire surface of the image, that is, flood coating. Applying a composition to part of an image, that is, spot coating, is possible, but it requires preparing a plate or cylinder prior to application of the overcoat composition. Thus, applying known coating formulations can be inefficient, difficult, and time-consuming and is not desirable for integration with variable-data digital printing.

Coating formulations for ink-based images are known. For example, UV curable ink-jet overcoats have been used in an attempt to overcome the failure of ink jet-generated images to withstand heat and sunlight. Typically, such UV curable ink-jet overcoats include polymerizable monomers, oligomers, or a mixture thereof. However, these UV curable ink-jet overcoats perform poorly when required to uniformly wet an ink-based image while simultaneously not increasing the transparency of the paper adjacent to the image.

A need exists for an ink jettable protective composition that provides overcoat coating properties including, for example, thermal and light stability, scratch resistance, and smear (or rub) resistance to toner-based images and ink-based images, particularly in commercial print applications. More specifically, a need exists for an overcoat coating that has a low viscosity (to enable ink jetting), yet is stable at the generally high temperature required for ink jetting and achieves the desired properties, including, but not limited to, the ability to wet over waxy surfaces from either solid ink jet prints or the waxy surfaces of toner fused in the absence of silicone oil, to remain on the surface of porous substrates and to not increase the transparency of the substrate, permit overwriting, reduce or prevent thermal cracking in response to thermal expansion of the toner, and protect an image from sun, heat, etc. In addition, a need still exists for a curable overcoating composition that does not yellow upon application and curing of the overcoating composition on a printed image.

SUMMARY

In embodiments, described is an overcoat composition, comprising at least one gellant, at least one monomer, and a photoinitiator package, wherein the overcoat composition is curable upon exposure to radiation and the overcoat composition is substantially colorless and does not substantially yellow upon curing.

In further embodiments, described is an overcoat composition, comprising at least one gellant, at least one monomer, and a photoinitiator package, wherein the photoinitiator package includes at least one substantially non-yellowing photoinitiator.

In yet further embodiments, described is a process, comprising forming a image on a substrate, coating the image with a heated substantially colorless overcoat composition such that the overcoat composition partially or completely covers the image and at least partially covers the substrate where no image is present, allowing the overcoat composition to cool such that the viscosity of the overcoat composition increases, and applying radiation to substantially cure the overcoat composition, wherein the substantially cured overcoat composition is substantially colorless and does not substantially yellow upon curing, and wherein the overcoat composition comprises at least one gellant, at least one monomer, and a photoinitiator package.

EMBODIMENTS

Described herein are radiation curable overcoat compositions comprising at least one gellant, at least one monomer, a photoinitiator package, a stabilizer, optionally a curable wax, and optionally a surfactant, and wherein the overcoat composition is substantially free of colorant.

The overcoat compositions described herein may be jetted at temperatures of from about 70° C. to about 100° C., such as from about 75° C. to about 90° C. At jetting, the overcoat compositions may have a viscosity of from about 5 to about 16 cPs, such as from about 8 to 13 cPs. The overcoat compositions are thus ideally suited for use in ink jet devices.

The gelling agent functions to increase the viscosity of the overcoat composition within a desired temperature range. In particular, the gelling agent forms a solid-like gel in the overcoat compositions at temperatures below the gel point of the gelling agent, for example, below the temperature at which the overcoat composition is jetted. For example, the overcoat composition ranges in viscosity from about $10^3$ to about $10^7$ cPs, such as from about $10^{3.5}$ to about $10^{6.5}$ cPs in the solid-like phase. These viscosities are obtained using the cone and plate technique, at a shear rate of $1 \, s^{-1}$. The gel phase typically comprises a solid-like phase and a liquid phase in coexistence, wherein the solid-like phase forms a three-dimensional network structure throughout the liquid phase and prevents the liquid phase from flowing at a macroscopic level. The overcoat compositions exhibit a thermally reversible transition between the gel state and the liquid state when the temperature is varied above or below the gel point of the overcoat composition. This temperature is generally referred to as a sol-gel temperature. This cycle of gel reformation can be repeated a number of times, since the gel is formed by physical, non-covalent interactions between the gelling agent molecules, such as hydrogen bonding, aromatic interactions, ionic bonding, coordination bonding, London dispersion interactions, or the like.

In embodiments, the temperature at which the overcoat composition is in gel state is, for example, approximately from about 15° C. to about 55° C., such as from about 15° C. to about 50° C. The gel overcoat composition liquefies at temperatures of from about 60° C. to about 90° C., such as from about 70° C. to about 85° C. In cooling from the jetting temperature liquid state to the gel state, the overcoat composition undergoes a significant viscosity increase. The viscosity increase is at least a three orders of magnitude increase in viscosity, such as at least a four order of magnitude increase in viscosity.

The overcoat composition may be jetted directly onto the image receiving substrate. The overcoat composition may then be leveled by contact or non-contact leveling, for example as disclosed in U.S. patent application Ser. No. 12/023,979, filed Jan. 31, 2008, to Kovacs et al.

Following jetting, the overcoat is typically cooled to below the gel point of the composition in order to take advantage of the properties of the gelling agent. The composition may then be exposed to curing energy for curing of the composition. Upon exposure to a suitable source of curing energy, for example, ultraviolet light, electron beam energy, and the like, the photoinitiator absorbs the energy and sets into motion a reaction that converts the gel-like overcoat composition into a cured protective overcoat. The viscosity of the overcoat composition further increases upon exposure to the suitable source of curing energy, such that it hardens to a solid; the viscosity of the cured overcoat composition is not routinely measurable. The monomer, and optionally the gellant, in the composition contain functional groups that polymerize as a result of the exposure of one or more photoinitiators to UV light to readily crosslink, forming a polymer network. In the absence of photoinitiators these functional groups may polymerize as a result of exposure to e-beam radiation. This polymer network provides printed images with, for example, durability, thermal and light stability, and scratch and smear resistance. Thus, the composition is particularly well-suited for coating ink-based images and toner-based images on substrates subjected to heat and sunlight since the composition protects the image from cracking and fading, provides image permanence, and allows for overwriting in the absence of smearing and beading. The composition also optionally includes a wax and, thus, the composition may be particularly well-suited for coating ink-based images, where the ink of the images contains at least one wax, and toner-based images, where the toner of the images contains at least one wax.

The overcoat composition disclosed herein is substantially colorless. As used herein, "substantially colorless" refers to the overcoat composition being substantially or completely transparent or clear prior to and after undergoing curing. For this, the composition may be substantially free of colorants. The overcoat composition described herein does not yellow upon curing and remains substantially or completely transparent and clear, that is, little or no measurable difference in any of L* a* b* values or k, c, m, y is observed. Being "substantially non-yellowing" or "substantially or completely transparent or clear" refers to the overcoat composition changing color or hue upon curing in an amount of less than about 15%, such as less than about 10% or less than about 5%, for example about 0%.

In addition to the overcoat composition being substantially colorless prior to and after curing, the overcoat composition is also substantially or completely free of colorants, such as pigments, dyes or mixtures thereof. The overcoat composition being capable of being substantially or completely transparent and clear prior to and after curing is due in part to the one or more photoinitiators present in the overcoat composition, as will be described herein.

Gellants suitable for use in the radiation curable overcoat compositions include a curable gellant comprised of a curable polyamide-epoxy acrylate component and a polyamide component, a curable composite gellant comprised of a curable epoxy resin and a polyamide resin, amide gellants and the like. Inclusion of the gellant in the overcoat composition described herein permits the overcoat composition to coat a substrate (with or without an image thereon), without excessive penetration into the substrate because the viscosity of the overcoat composition is quickly increased as the overcoat composition cools. Excessive penetration of a liquid into a porous substrate such as paper can lead to an undesirable decrease in the substrate opacity. In embodiments, the curable gellant participates in the curing of the monomer(s) described herein. The increase in viscosity by including the gellant may also reduce the diffusion of oxygen into the overcoat because oxygen is an inhibitor of free radical polymerization.

The gellants suitable for use in the overcoat compositions described herein may be amphiphilic in nature in order to improve wetting when the overcoat composition is utilized over a substrate having silicone oil thereon. As used herein, amphiphilic refers to molecules that have both polar and non-polar parts of the molecule. For example, the gellants described herein may have long non-polar hydrocarbon chains and polar amide linkages.

Suitable composite gellants comprised of a curable epoxy resin and a polyamide resin are disclosed, for example, in commonly assigned U.S. Patent Application Publication No. 2007-0120921 A1, the entire disclosure of which is incorporated herein by reference. The epoxy resin component in the composite gellant can be any suitable epoxy group-containing material. In embodiments, the epoxy group containing component is selected from among the diglycidyl ethers of either polyphenol-based epoxy resin or a polyol-based epoxy resin, or mixtures thereof. That is, in embodiments, the epoxy resin has two epoxy functional groups that are located at the terminal ends of the molecule. The polyphenol-based epoxy resin in embodiments is a bisphenol A-co-epichlorohydrin resin with not more than two glycidyl ether terminal groups.

The polyol-based epoxy resin can be a dipropylene glycol-co-epichlorohydrin resin with not more than two glycidyl ether terminal groups. Suitable epoxy resins have a weight average molecular weight in the range of about 200 to about 800, such as about 300 to about 700. Commercially available sources of the epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth)acrylic acid.

As the polyamide component of the epoxy-polyamide composite gellant, any suitable polyamide material may be used. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, such as a diamine (for example, alkylenediamines such as ethylenediamine, DYTEK® series diamines, poly(alkyleneoxy)diamines, and the like, or also copolymers of polyamides such as polyester-polyamides and polyether-polyamides. One or more polyamide resins may be used in the formation of the gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are described as polyalkyleneoxydiamine polyamides with the general formula,

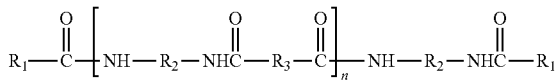

wherein $R_1$ is an alkyl group having at least seventeen carbons, $R_2$ includes a polyalkyleneoxide, $R_3$ includes a C-6 carbocyclic group, and n is an integer of at least 1.

Suitable gellants comprised of a curable polyamide-epoxy acrylate component and a polyamide component are disclosed, for example, in commonly assigned, U.S. Patent Application Publication No. 2007-0120924 A1, the entire disclosure of which is incorporated herein by reference. The curable polyamide-epoxy acrylate is curable by virtue of including at least one functional group therein. As an example, the polyamide-epoxy acrylate is difunctional. The functional group(s), such as the acrylate group(s), are radiation curable via free-radical initiation and enable chemical bonding of the gellant to the cured ink vehicle. A commercially available polyamide-epoxy acrylate is PHOTOMER® RM370 from Cognis. The curable polyamide-epoxy acrylate may also be selected from within the structures described above for the curable composite gellant comprised of a curable epoxy resin and a polyamide resin.

The polyamide resin component may increase the elastic nature of the gel state of the overcoat composition. That is, the value of the elastic modulus (G') is higher. When printing directly to paper, the requirement for higher elastic modulus (G') for the overcoat composition is reduced. Any suitable polyamide materials may be used for the polyamide component of the gellant, and exemplary materials are polyether-polyamides with low molecular weights that are, for example, in the range of from 1,000 to 5,000 grams per mole, but can also be outside of this range, and have low amine number such as in the range of from 0 to 10. Commercially available sources of polyamide resin include, for example, SYLVA-GEL® 1000 polyamide resin from Arizona Chemicals, and variants thereof.

Amide gellants suitable for use here are disclosed in U.S. Pat. Nos. 7,276,614 and 7,279,587, the entire disclosures of which are incorporated herein by reference.

In one embodiment, the amide gellant may be a compound of the formula

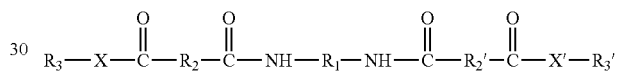

wherein:
$R_1$ is:
(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 12 carbon atoms, such as from about 1 carbon atom to about 8 carbon atoms or from about 1 carbon atom to about 5 carbon atoms, although the number of carbon atoms can be outside of these ranges,
(ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 1 carbon atom to about 15 carbon atoms, such as from about 3 carbon atoms to about 10 carbon atoms or from about 5 carbon atoms to about 8 carbon atoms, although the number of carbon atoms can be outside of these ranges,
(iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 6 carbon atoms to about 22 carbon atoms or from about 6 carbon atoms to about 12 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 5 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group) having from about 1 carbon atom to about 54 carbon atoms, such as from about 1 carbon atom to about 48 carbon atoms or from about 1 carbon atom to about 36 carbon atoms, although the number of carbon atoms can be outside of these ranges, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group) having from about 5 carbon atoms to about 15 carbon atoms, such as from about 5 carbon atoms to about 13 carbon atoms or from about 5 carbon atoms to about 10 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group) having from about 6 carbon atoms to about 32 carbon atoms, such as from about 7 carbon atoms to about 33 carbon atoms or from about 8 carbon atoms to about 15 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group) having from about 6 carbon atoms to about 32 carbon atoms, such as from about 6 carbon atoms to about 22 carbon atoms or from about 7 carbon atoms to about 15 carbon atoms, although the number of carbon atoms can be outside of these ranges, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

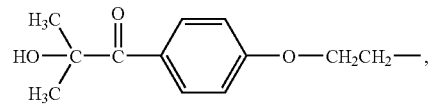

groups derived from 1-hydroxycyclohexylphenylketone, of the formula

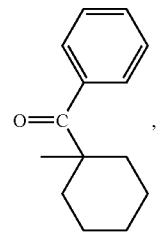

groups derived from 2-hydroxy-2-methyl-1-phenylpropan-1-one, of the formula

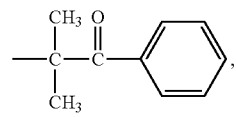

groups derived from N,N-dimethylethanolamine or N,N-dimethylethylenediamine, of the formula

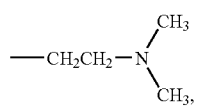

or the like, or:
(b) a group which is:
   (i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group) having from about 2 carbon atoms to about 100 carbon atoms, such as from about 3 carbon atoms to about 60 carbon atoms or from about 4 carbon atoms to about 30 carbon atoms,
   (ii) an aryl group (including substituted and unsubstituted aryl groups, and wherein heteroatoms, such as oxygen, nitrogen, sulfur, silicon, phosphorus, boron, and the like either may or may not be present in the aryl group) having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, such as phenyl or the like,
   (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group) having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, such as benzyl or the like, or
   (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group) having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;
and X and X' each, independently of the other, is an oxygen atom or a group of the formula —$NR_4$—, wherein $R_4$ is:

(i) a hydrogen atom;
(ii) an alkyl group, including linear and branched, saturated and unsaturated, cyclic and acyclic, and substituted and unsubstituted alkyl groups, and wherein heteroatoms either may or may not be present in the alkyl group, having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges,
(iii) an aryl group, including substituted and unsubstituted aryl groups, and wherein heteroatoms either may or may not be present in the aryl group, having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges,
(iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, or
(v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, having from about 5 carbon atoms to about 100 carbon atoms, such as from about 5 carbon atoms to about 60 carbon atoms or from about 6 carbon atoms to about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, $R_2$ and $R_2'$ are the same as each other; in another specific embodiment, $R_2$ and $R_2'$ are different from each other. In one specific embodiment, $R_3$ and $R_3'$ are the same as each other; in another specific embodiment, $R_3$ and $R_3'$ are different from each other.

In one specific embodiment, $R_2$ and $R_2'$ are each groups of the formula —$C_{34}H_{56+a}$— and are branched alkylene groups which may include unsaturations and cyclic groups, wherein a is an integer of 0, 1, 2, 3, 4, 5, 6, 7, 8, 9, 10, 11, or 12, including isomers of the formula

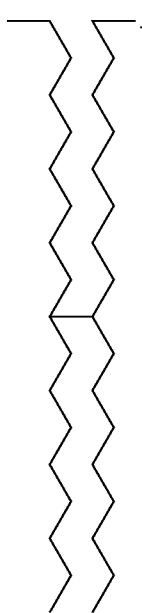 [SMILES: CCCCCCCCCC(CCCCCCCC)C(CCCCCCCC)CCCCCCCCC ; "."]
In one specific embodiment, $R_1$ is an ethylene (—CH$_2$CH$_2$—) group.
In one specific embodiment, $R_3$ and $R_3'$ are both
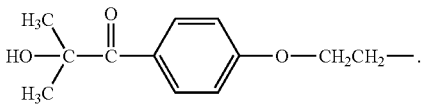
In one specific embodiment, the compound is of the formula
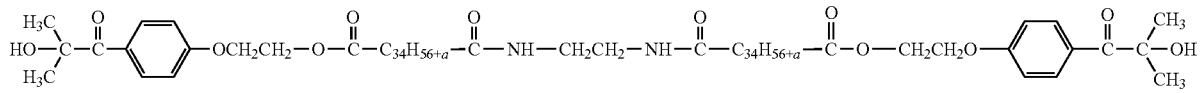
wherein —C$_{34}$H$_{56+a}$— represents a branched alkylene group which may include unsaturations and cyclic groups, wherein a is an integer of 0, 1, 2, 3, 4, 5, 6, 7, 8, 9, 10, 11, or 12, including isomers of the formula
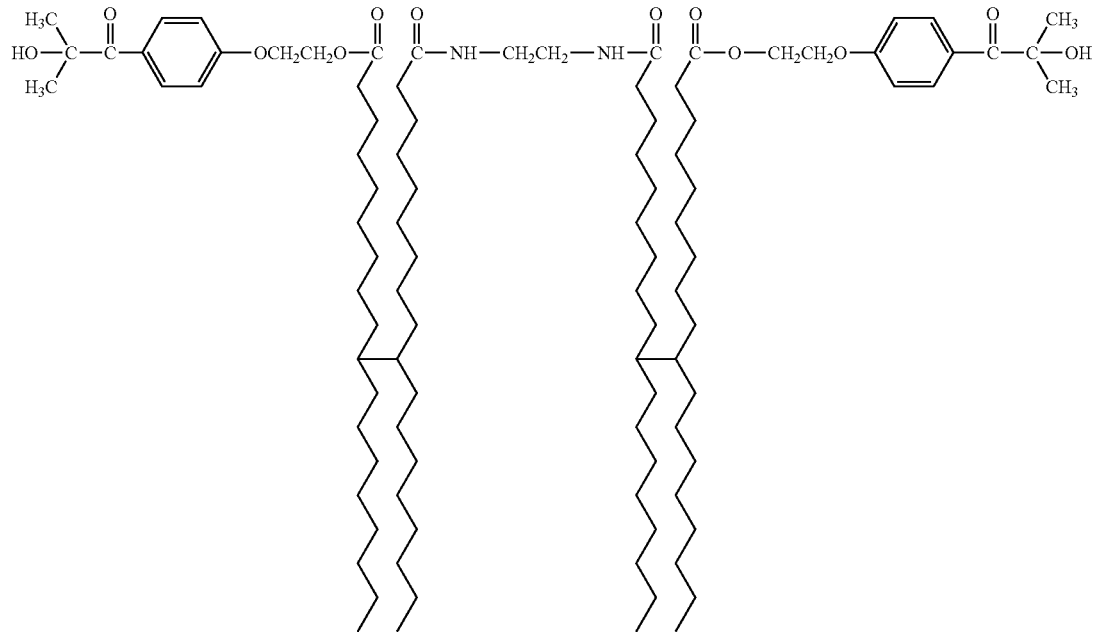 [SMILES: CCCCCCCCC(CCCCCCCCC(=O)NCCNC(=O)CCCCCCCCC(CCCCCCCC)C(CCCCCCCC)CCCCCCCCC(=O)OCCOc1ccc(C(=O)C(C)(C)O)cc1)C(CCCCCCCC)CCCCCCCCC(=O)OCCOc1ccc(C(=O)C(C)(C)O)cc1]

Additional specific examples of suitable amide gellants include those of the formula

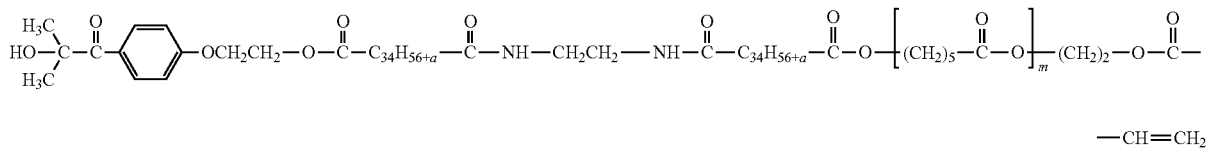

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein m is an integer, including but not limited to embodiments wherein m is 2, including isomers of the formula

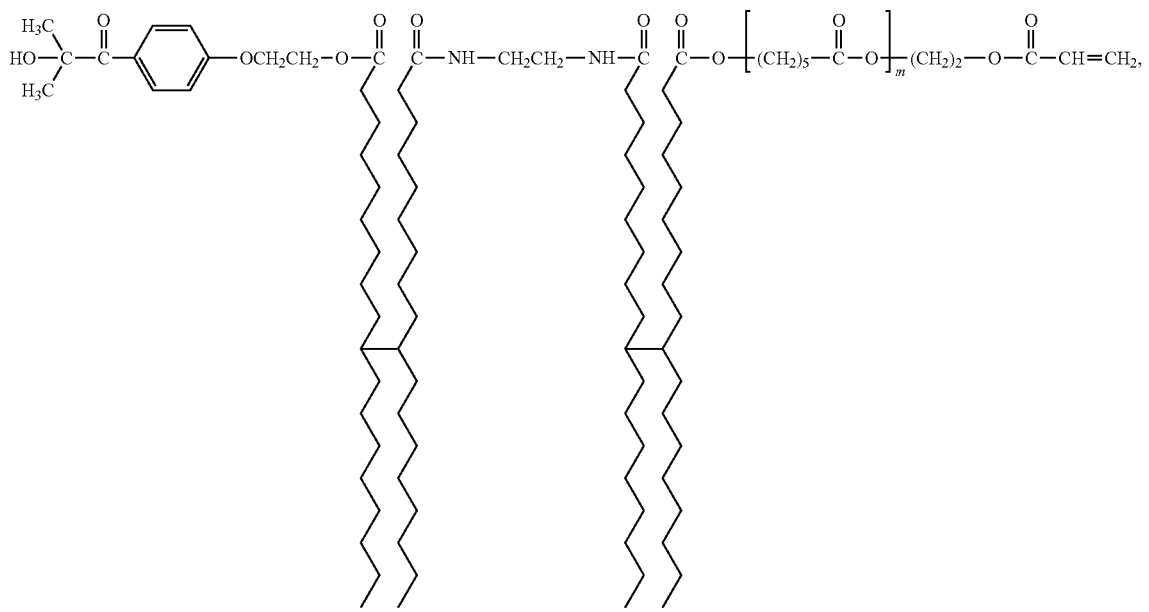

those of the formula

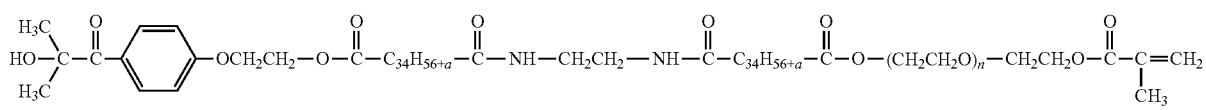

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein n is an integer, including but not limited to embodiments wherein n is 2 and wherein n is 5, including isomers of the formula

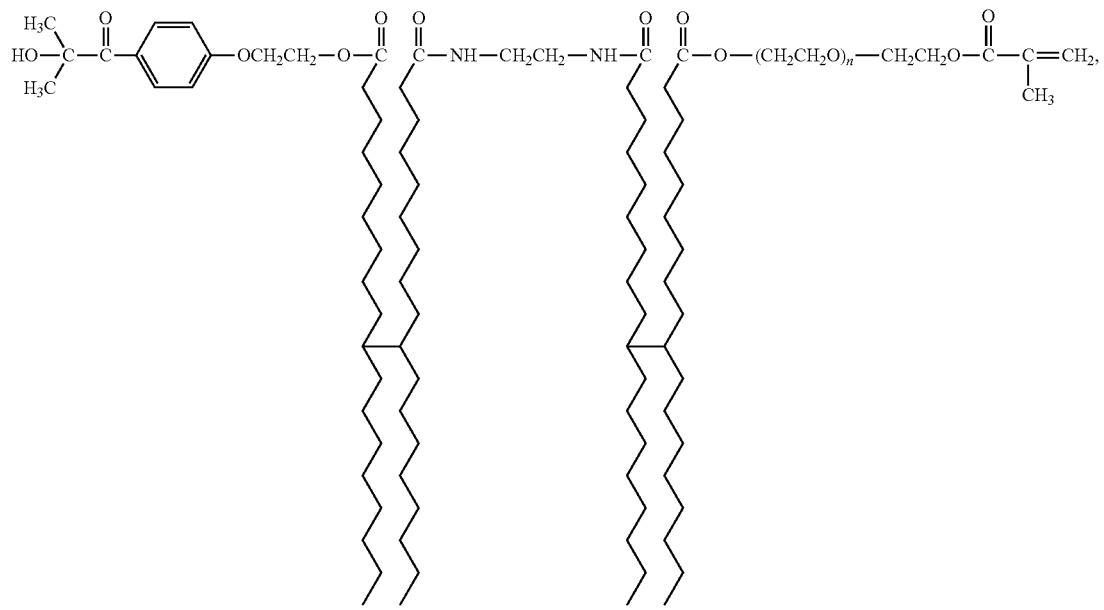
those of the formula
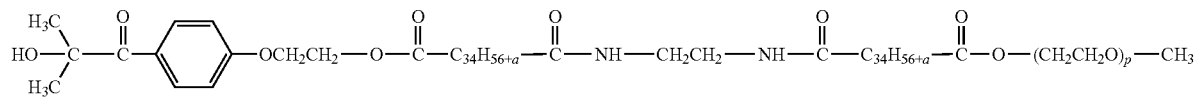
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein p is an integer, including to embodiments wherein p is 2 and wherein p is 3, including isomers of the formula
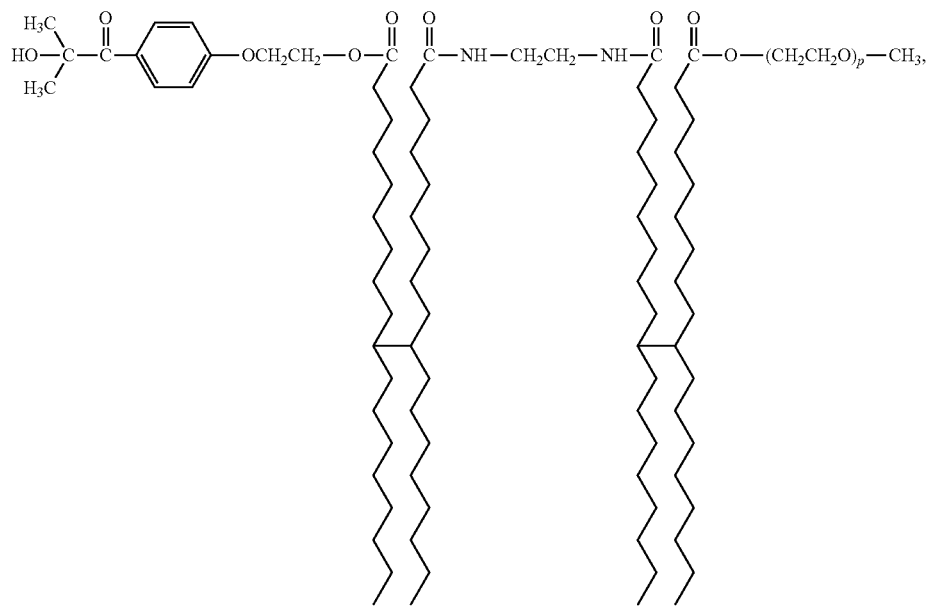

those of the formula

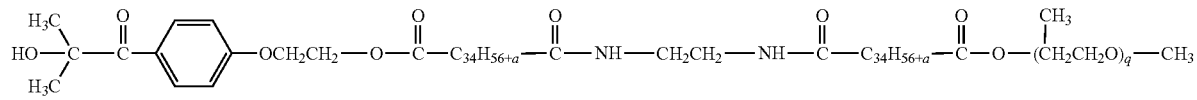

wherein —C$_{34}$H$_{56+a}$— represents a branched alkylene group which may include unsaturations and cyclic groups, wherein a is an integer of 0, 1, 2, 3, 4, 5, 6, 7, 8, 9, 10, 11, or 12 and wherein q is an integer, including embodiments wherein q is 2 and wherein q is 3, including isomers of the formula

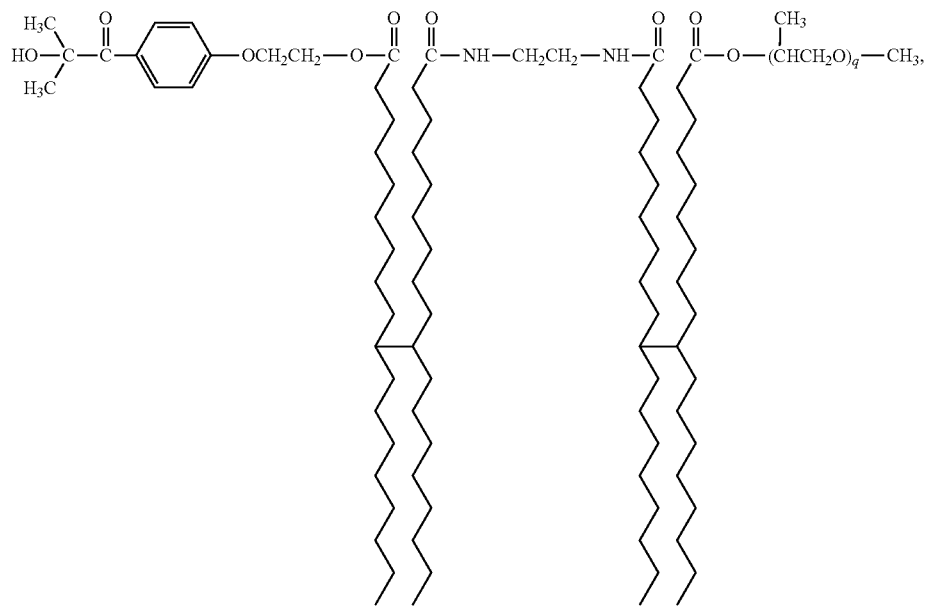

those of the formula

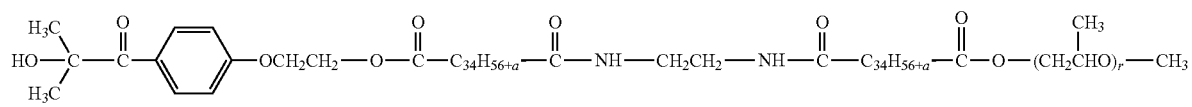

wherein —C$_{34}$H$_{56+a}$— represents a branched alkylene group which may include unsaturations and cyclic groups, wherein a is an integer of 0, 1, 2, 3, 4, 5, 6, 7, 8, 9, 10, 11, or 12 and wherein r is an integer, including embodiments wherein r is 2 and wherein r is 3, including isomers of the formula

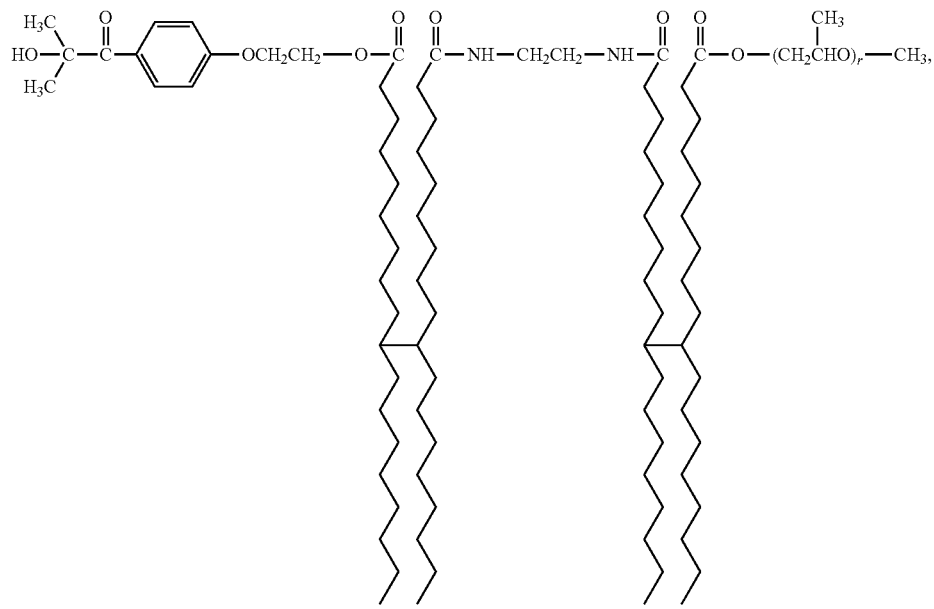

and the like, as well as mixtures thereof.

The overcoat compositions may include the gellant in any suitable amount, such as about 1% to about 50% by weight of the overcoat composition. In embodiments, the gellant can be present in an amount of about 2% to about 20% by weight of the overcoat composition, such as about 3% to about 10% by weight of the overcoat composition, although the value can also be outside of this range.

Examples of radiation curable monomers used in the overcoat compositions include propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, di-trimethylolpropane tetraacrylate, dipentaerythritol pentaacrylate, ethoxylated pentaerythritol tetraacrylate, propoxylated glycerol triacrylate, isobornyl methacrylate, lauryl acrylate, lauryl methacrylate, neopentyl glycol propoxylate methylether monoacrylate, isodecylmethacrylate, caprolactone acrylate, 2-phenoxyethyl acrylate, isooctylacrylate, isooctylmethacrylate, butyl acrylate, mixtures thereof and the like. The curable monomer in embodiments is included in the overcoat composition in an amount of, for example, about 20 to about 95% by weight of the overcoat composition, such as about 30 to about 85% by weight of the overcoat composition, or about 40 to about 80% by weight of the overcoat composition.

Oligomers may be optionally used in the overcoat composition in an amount of from 0 to about 30 weight percent, such as from 0 to about 25 or from about 0 to 20 weight percent. Examples of suitable radiation curable oligomers that may be used in the overcoat compositions have a low viscosity, for example, from about 50 cPs to about 10,000 cPs, such as from about 75 cPs to about 7,500 cPs or from about 100 cPs to about 5,000 cPs. Examples of such oligomers may include CN549, CN131, CN131B, CN2285, CN 3100, CN3105, CN132, CN133, CN 132, available from Sartomer Company, Inc., Exeter, Pa., Ebecryl 140, Ebecryl 1140, Ebecryl 40, Ebecryl 3200, Ebecryl 3201, Ebecryl 3212, available from Cytec Industries Inc, Smyrna Ga., Photomer 3660, Photomer 5006F, Photomer 5429, Photomer 5429F, available from Cognis Corporation, Cincinnati, Ohio, Laromer PO 33F, Laromer PO 43F, Laromer PO 94F, Laromer UO 35D, Laromer PA 9039V, Laromer PO 9026V, Laromer 8996, Laromer 8765, Laromer 8986, available from BASF Corporation, Florham Park, N.J., and the like.

The overcoat composition described herein further includes a photoinitiator package having at least one photoinitiator for initiating curing, for example UV curing. Any photoinitiator that absorbs radiation, for example UV light radiation, to initiate curing of the curable components of the formulation, but does not substantially produce a yellow coloration upon cure, may be used.

As a photoinitiator for ink compositions of embodiments that are cured by free-radical polymerization, for example, ink compositions containing (meth)acrylate groups or inks comprised of polyamides, mention may be made of photoinitiators such as benzophenones, benzoin ethers, benzil ketals, α-hydroxyalkylphenones, and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenylphosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-hydroxy-1-(4-(4-(2-hydroxy-2-methylpropionyl)-benzyl)-phenyl)-2-methylpropan-1-one (available as Ciba IRGACURE 127); titanocenes; isopropylthioxanthione; 1-hydroxycyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methy-1-(4-(1-methylvinyl)phenyl) propanone); 2-hydroxy-2-methyl-1-phenyl-1-propanone; benzyldimethylketal; and mixtures thereof.

Mention may also be made of amine synergists, that is, co-initiators that donate a hydrogen atom to a photoinitiator and thereby form a radical species that initiates polymerization (amine synergists can also consume oxygen dissolved in the formulation—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation, such as UV light, but does not become colored following irradiation, can be used without limitation.

In embodiments, the photoinitiator package may include at least one alpha-hydroxy ketone photoinitiator and at least one phosphinoyl type photoinitiator(s), which is in contrast to known photoinitiator packages that include an alpha-amino ketone derivative photoinitiator. One example of the alpha-hydroxy ketone photoinitiator is IRGACURE 127, while one example of the phosphinoyl type photoinitiator is IRGACURE 819, both available from Ciba-Geigy Corp., Tarrytown, N.Y.

The total amount of photoinitiator included in the overcoat composition may be, for example, from about 0.5 to about 15%, such as from about 1 to about 10%, by weight of the overcoat composition. The ratio of the alpha-hydroxy ketone photoinitiator to the phosphinoyl type photoinitiator may be, for example, from about 90:10 to about 10:90, such as from about 80:20 to about 20:80 or from about 70:30 to about 30:70.

The optional wax may be any wax component that is miscible with the other components and that will polymerize with the curable monomer to form a polymer. The term "wax" includes, for example, any of the various natural, modified natural, and synthetic materials commonly referred to as waxes. A wax is solid at room temperature, specifically at 25° C. Inclusion of the wax promotes an increase in viscosity of the overcoat composition as it cools from the jetting temperature. Thus, the wax may assist the gellant in avoiding bleadthrough of the overcoat composition through the substrate.

In specific embodiments, the wax is curable. Suitable examples of curable waxes include, but are not limited to, those waxes that include or are functionalized with curable groups. The curable groups may include, for example, acrylate, methacrylate, alkene, allylic ether, epoxide, oxetane, and the like. These waxes can be synthesized by the reaction of a wax equipped with a transformable functional group, such as carboxylic acid or hydroxyl. The curable waxes described herein may be cured with the disclosed monomer(s).

Suitable examples of hydroxyl-terminated polyethylene waxes that may be functionalized with a curable group include, but are not limited to, mixtures of carbon chains with the structure $CH_3$—$(CH_2)_n$—$CH_2OH$, where there is a mixture of chain lengths, n, where the average chain length can be in the range of about 16 to about 50, and linear low molecular weight polyethylene, of similar average chain length. Suitable examples of such waxes include, but are not limited to, the UNILIN® series of materials such as UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Exemplary Guerbet alcohols include those containing about 16 to about 36 carbons, many of which are commercially available from Jarchem Industries Inc., Newark, N.J. PRIPOL® 2033 (C-36 dimer diol mixture including isomers of the formula

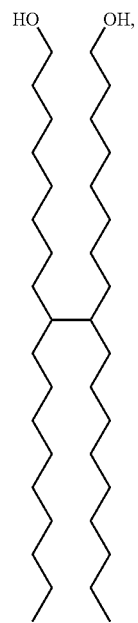

as well as other branched isomers that may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference) can also be used. These alcohols can be reacted with carboxylic acids equipped with UV curable moieties to form reactive esters. Examples of these acids include acrylic and methacrylic acids, available from Sigma-Aldrich Co. In embodiments, suitable curable monomers include waxy acrylates, such as acrylates of UNILIN® 350, UNILIN® 425, UNILIN® 550 and UNILIN® 700.

Suitable examples of carboxylic acid-terminated polyethylene waxes that may be functionalized with a curable group include mixtures of carbon chains with the structure $CH_3$—$(CH_2)_n$—$COOH$, where there is a mixture of chain lengths, n, where the average chain length is about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—$COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Exemplary Guerbet acids include those containing 16 to 36 carbons, many of which are commercially available from Jarchem Industries Inc., Newark, N.J. PRIPOL® 1009 (C-36 dimer acid mixture including isomers of the formula

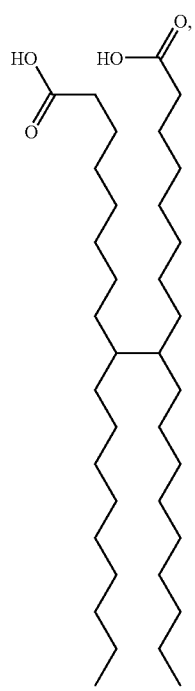

as well as other branched isomers that may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, $4^{th}$ Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, but are not limited to, 2-allyloxyethanol from Sigma-Aldrich Co.;

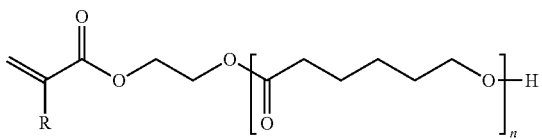

TONE M-101 (R=H, $n_{avg}$=1), TONE M-100 (R=H, $n_{avg}$=2) and TONE M-201 (R=Me, $n_{avg}$=1) from The Dow Chemical Company; and

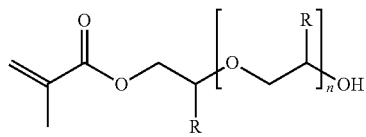

CD572 (R=H, n=10) and SR604 (R=Me, n=4) from Sartomer Company, Inc.

The curable wax can be included in the overcoat composition in an amount of from, for example, about 1% to about 20% by weight of the overcoat composition, such as from about 1% to about 15% or from about 2% to 10% by weight of the overcoat composition. In an embodiment, the curable wax can be included in the overcoat composition in an amount of from about 3% to about 10% by weight of the overcoat composition, such as from about 4% to about 9% by weight of the overcoat composition.

Surfactants may also optionally be used to lower the surface tension of the composition to allow wetting and leveling of images on the substrate surface, if necessary, before curing. Any surfactant that has this capability may be used. However, in embodiments, the surfactant is not required, and need not be included. When present, surfactants include fluorinated alkyl esters, polyether modified polydimethylsiloxanes, having the structure:

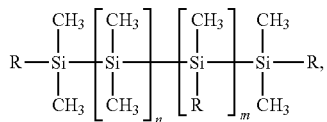

wherein the R groups are functional modifications, such as, for example, BYK®-UV3510 (BYK Chemie GmbH, Wesel, Germany), and BYK®-348 (BYK Chemie GmbH), and fluorosurfactants, such as, for example, ZONYL® FSO-100 (E.I. Du Pont de Nemours and Co., Wilmington, Del.), having the formula $RfCH_2CH_2O(CH_2CH_2O)xH$, wherein Rf=F$(CF_2CF_2)y$, x=0 to about 15, and y=1 to about 7.

In embodiments, the amount of optional surfactant present in the overcoat composition may be from about 0 weight percent to about 15 weight percent of the overcoat composition, such as from about 0 weight percent to about 10 weight percent or from about 0.1 weight percent to about 5 weight percent of the overcoat compositions.

The overcoat compositions may also optionally contain an antioxidant. The optional antioxidants of the overcoat compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn AG, Zurich, Switzerland, and the like.

The overcoats of embodiments may further include conventional type additives to take advantage of the known functionality associated with such conventional additives. Such additives may include, for example, defoamers, slip and leveling agents, etc.

In embodiments, the overcoat composition described herein may be prepared by mixing the curable monomer and the gellant at a temperature of from about 75° C. to about 120° C., such as from about 80° C. to about 110° C. or from about 75° C. to about 100° C., until homogenous. If a curable wax is utilized, it may be included in the mixture of monomer and gellant. Once the mixture of the monomer and gellant are homogenous, then the photoinitiator or photoinitiators and optional surfactant may be added. Alternatively, the curable monomer, gellant, photoinitiator(s), optional wax and optional surfactant can be combined immediately. The resulting mixture is stirred at a temperature of from about 75° C. to about 120° C., such as from about 80° C. to about 110° C. or from about 75° C. to about 100° C., for from about 1 hour to about 3 hours, such as about 2 hours.

The overcoat compositions of the present disclosure can be used in image processing comprising generating an ink-based or toner-based image on a substrate, following the generation of the image, ink jetting the overcoat composition onto the substrate as a whole, onto the image as a whole, onto part(s) of the image, onto part(s) of the substrate, or any combination thereof, and curing the overcoat composition.

The substrate employed can be any appropriate substrate depending upon the end use of the print. Exemplary substrates include, but are not limited to, plain paper, coated paper, plastics, polymeric films, treated cellulosics, wood, xerographic substrates, ceramics, fibers, metals and mixtures thereof, optionally comprising additives coated thereon.

When coating a toner-based image, the fused toner-based print is obtained first and then subjected to an ink jet printer containing the jettable overcoat composition. The toner-based print can be prepared by any suitable conventional xerographic technique or variant thereof.

Similarly, when coating an ink-based image, the ink-based image is generated first and then subjected to an ink jet printer containing the jettable overcoat composition. If the ink-based image is formed using an ink jet printer, then the ink-based image can be subjected to a separate ink jet printer containing the jettable overcoat composition or the ink jet ink can be housed in the same ink jet printer as the composition, whereby the composition is coated onto the substrate and/or image as a colorless, transparent fluid after the ink jet ink image is formed. When the overcoat composition is coated over an ink-based image, particularly, an image produced using an ink jet printer, the image can be prepared by any suitable conventional process or variant thereof.

When the composition is coated onto an image, parts thereof, substrate, and/or parts thereof, it can be applied at different levels of resolution. For example, the composition can be applied at the resolution of the print halftone dot, at the resolution of distinct part(s) of the image, or at a little less resolution than distinct part(s) of the image, allowing for some overlap of the composition onto nonimaged areas of the substrate. The typical composition deposition level is in an amount of from about 5 to about 50 picoliters drop size. The composition can be applied in at least one pass over the image at any stage in the image formation using any known ink jet printing technique, such as, for example, drop-on-demand ink jet printing including, but not limited to, piezoelectric and acoustic ink jet printing. The application of the composition can be controlled with the same information used to form the image such that only one digital file is needed to produce the image and the overcoat composition. Thus, the overcoat composition is fully digital.

The energy source used to initiate crosslinking of the radiation curable oligomer and/or monomer components of the composition can be actinic, for example, radiation having a wavelength in the ultraviolet or visible region of the spectrum, accelerated particles, for example, electron beam radiation, thermal, for example, heat or infrared radiation, or the like. In embodiments, the energy is actinic radiation because such energy provides excellent control over the initiation and rate of crosslinking. Suitable sources of actinic radiation include, but are not limited to, mercury lamps, xenon lamps, carbon arc lamps, tungsten filament lamps, lasers, light emitting diodes, sunlight, and the like.

Actinic radiation as used herein refers to electromagnetic radiation having a sufficient energy to produce photochemical reactions. In the case of UV radiation, the light that is absorbed by the photoinitiator promotes an electron to a higher energy molecular orbital, the promoted electron will seek to return to a lower energy level or decay. One pathway that can occur during the electron's decay results in the homolytic cleavage of a covalent bond in the photoinitiator to provide two free radicals, one or both radicals may have the correct energy to react, with the reactive double bond of the (meth)acrylate group found in the monomer, gellant, optional reactive wax or optional oligomer. This step is known as polymerization initiation and it sets off a chain reaction where the reactive double bonds rapidly link together as the free radical chain end moves through the overcoat film. The result is conversion of a monomer to a polymer or polymerization, and the film thereby hardens. Variations on this route are known, the promoted electron in some photoinitiators lacks the energy to react directly with a double bond in another molecule, instead it abstracts a hydrogen atom from a third molecule resulting in a free radical on the third molecule and this molecule initiates the radical polymerization. In the case of e-beam radiation, photoinitiators are not required as the energy of the e-beam is high enough to cause radical formation on the reactive double bond of the (meth)acrylate group found in the monomer, gellant, optional reactive wax or optional oligomer and this initiation step leads to the same polymerization as with UV radiation and photoinitiators.

Ultraviolet radiation, especially from a medium pressure mercury lamp with a high speed conveyor under UV light, for example, about 20 to about 70 m/min may be desired, wherein the UV radiation is provided at a wavelength of about 200 to about 500 nm for about less than one second. In embodiments, the speed of the high speed conveyor is about 15 to about 35 m/min under UV light at a wavelength of about 200 to about 450 nm for about 10 to about 50 milliseconds (ms). The emission spectrum of the UV light source generally overlaps the absorption spectrum of the UV-initiator. Optional curing equipment includes, but is not limited to, a reflector to focus or diffuse the UV light, and a cooling system to remove heat from the UV light source.

The disclosure will be illustrated further in the following nonlimiting Examples. The Examples are intended to be illustrative only. The disclosure is not intended to be limited to the materials, conditions, process parameters, and the like, recited herein. Parts and percentages are by weight unless otherwise indicated.

Example

An overcoat composition having the components in amounts set forth in Table 1 was prepared by mixing all of the components together.

TABLE 1

| Component | Function | wt % |
|---|---|---|
| Curable amide gellant | Phase change | 7.5% |
| UNILIN 350-acrylate curable wax | Phase change | 5% |
| SR 399LV acrylate monomer (Sartomer) | Monomer | 5% |
| DAROCUR ITX (Ciba) | Photoinitiator | 2% |
| IRGACURE 819 (Ciba) | Photoinitiator | 1% |
| IRGACURE 127 (Ciba) | Photoinitiator | 3.5% |
| IRGASTAB UV10 (Ciba) | Stabilizer | 0.2% |
| SR9003 acrylate monomer (Sartomer) | Monomer | 75.8% |
| TOTAL | | 100% |

IRGASTAB UV10 is a stabilizer or polymerization inhibitor to keep the overcoat from polymerizing during storage.

The overcoat composition was produced by mixing the monomers, the curable wax and the gellant at a temperature of about 90° C., until homogeneous. The gellant used in the present example was a mixture of:

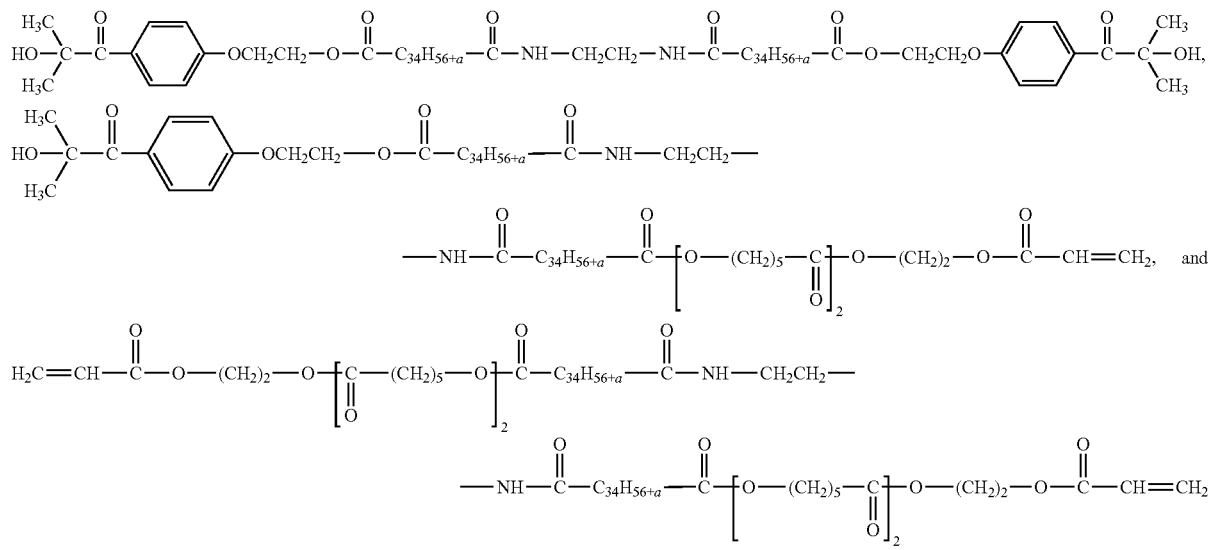

wherein —C$_{34}$H$_{56+a}$— represents a branched alkylene group which may include unsaturations and cyclic groups, wherein a is an integer of 0, 1, 2, 3, 4, 5, 6, 7, 8, 9, 10, 11, or 12 and wherein mixtures of the first:second:third compounds above are in a molar ratio of about 1:2:1.

Once the mixture of monomers, the curable wax and the gellant were homogeneous, the photoinitiators and stabilizers were added to the solution, and the resulting mixture was stirred at a temperature of about 90° C. for about 2 hours.

Several advantages of the above formulation were found.

First, the above overcoat composition is cured at a rate of up to about 75 m/min and undergoes no visible discoloration, such as photoyellowing. When coated over cyan, magenta and/or yellow images generated xerographically or by an ink-jet printer, minimal changes to the L*a*b* values or the k, c, m, y are observed, as demonstrated in Table 2 below. The fact that the image color properties are substantially unaltered by application of the overcoat composition is important, and one key to the formulation of a non-yellowing overcoat composition may be the photoinitiator package, that is, the use of photoinitiators that do not yellow upon curing, such as alpha-hydroxy ketone and phosphinoyl type photoinitiators.

| Sample | L* | a* | b* | Black (k) | Cyan (c) | Magenta (m) | Yellow (y) |
|---|---|---|---|---|---|---|---|
| Uncoated Toner-Based Blue Image | 51.37 | −23.35 | −45.11 | .799 | 1.185 | .563 | .28 |
| Uncoated Toner-Based Red Image | 46.08 | 61.74 | 47.24 | .694 | .192 | 1.343 | 1.663 |
| Uncoated Toner-Based Yellow Image | 81.87 | −1.26 | 81.4 | .2 | .135 | .22 | 1.38 |
| Coated Toner-Based Blue Image | 50.3 | −24.45 | −44.94 | .823 | 1.243 | .578 | .293 |
| Coated Toner-Based Red Image | 46.12 | 61.37 | 45.46 | .695 | .195 | 1.336 | 1.616 |
| Coated Toner-Based Yellow Image | 80.58 | −1.14 | 81.74 | .217 | .148 | .237 | 1.461 |
| Uncoated Ink-Based Blue Image | 46.62 | −26.01 | −40.04 | .898 | 1.246 | .647 | .422 |
| Uncoated Ink-Based Red Image | 52.43 | 54.27 | 34.72 | .591 | .201 | 1.042 | 1.069 |
| Uncoated Ink-Based Yellow Image | 84.37 | 4.6 | 90.73 | .159 | .106 | .197 | 1.145 |
| Coated Ink-Based Blue Image | 46.59 | −26.73 | −40.03 | .899 | 1.266 | .645 | .42 |
| Coated Ink-Based Red Image | 52.56 | 52.15 | 36.84 | .591 | .215 | 1.109 | 1.1 |
| Coated Ink-Based Yellow Image | 83.32 | 3.96 | 91.39 | .173 | .12 | .214 | 1.225 |

The L*, a* and b* are coordinates in the CIE L* a* b* color space. The CIE (Commission internationale de l'éclairage or International Commission on Illumination) began in 1931 to develop standard references defining colors. The CIE L* a* b* is widely applied for measurements in the subtractive CMYK color set. L* a* b* refer to coordinates of the system, for example, a* refers to the green-red axis, where the more negative a* is greener and the more positive a* is redder, b* refers to the blue-yellow axis, where yellow values are positive, and L* is a scale from 0 to 100 where lower values indicate a "darker" color or less luminance. Commercial instrumentation is widely available for performing these measurements. In this Example, a X-RITE 938 SPECTRODENSITOMETER was used. The system is very sensitive and the very small changes in L*a*b* between a coated and uncoated sample indicate that the overcoat is not affecting the underlying color in a way that is perceptible to the human eye.

The c, m, y, k values are optical densities measured using the X-RITE 938 as a reflection densitometer. Density is defined as the negative logarithm of the reflectance of the sample. Since both reflectance and density are dependent on the wavelength (or color) of the incident light, colored filters are used to separate the incident light into color bands. The c, m, y, k values are the negative logarithms of the amount of reflected light of each color.

Second, curable inks are by nature extremely robust, and the overcoat composition disclosed herein adheres to the surface of ink-based images, which confers increased robustness and improves image permanence. For example, a typical wax ink-based image on plain paper is easily removed when scratched with a pencil having a hardness of 2B. However, after application of the overcoat composition set forth in Table 1, the threshold for scratch is increased by four "levels," that is, an overcoated ink-based image is removed when scratched with a pencil having a hardness of 2H. For example, levels of pencil graphite hardness may be 2B, 1B, HB, 1H, 2H in order of increasing hardness, the full scale ranging from 6B to 6H.

Third, "bleed" or showthrough of ink-based images is significantly reduced as compared to traditional aqueous or solvent-based ink systems when coated with the overcoat composition of Table 1. The combination of a curable wax and a curable gellant prevents soakthrough on porous media. As such, the overcoat composition of Table 1 does not soak or bleed through the printed media, and it is possible to extend the coating beyond the colored image without causing the recording medium, such as paper, to become more transparent.

Fourth, examination of colored patches printed using toner and ink, which had been coated with the overcoat composition of Table 1, demonstrated good wetting of the surface. Essentially the coated patches appear identical to the uncoated patches. No "islands" of the overcoat composition were observed on the printed surface, as would be expected for a poorly "wetted" surface.

Fifth, overcoat composition of Table 1 had suitable rheological properties for application by a piezoelectric ink jet process. For example, the overcoat composition of Table had a viscosity of from about 5 to about 16 cPs at a temperature between 65 and 100° C.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An overcoat composition, comprising:
   at least one gellant;
   at least one monomer; and
   a photoinitiator package,
   wherein the overcoat composition exhibits a thermally reversible transition between a gel state and a liquid state when a temperature is varied above or below a gel point of the at least one gellant, wherein the overcoat composition further includes at least one reactive wax capable of participating in polymerization with the at least one monomer, wherein the photoinitiator package includes at least one alpha-hydroxy ketone photoinitiator and at least one phosphinoyl photoinitiator, wherein the at least one gellant comprises at least one curable amide gellant, and wherein the overcoat composition is curable upon exposure to radiation and the overcoat composition is substantially colorless and does not substantially yellow upon curing;
   wherein the CIE L*, a* and b* value differences, determined from uncoated images or substrates and the overcoat coated images or substrates, differs by an amount of no greater 2.12.

2. The overcoat composition according to claim 1, wherein the photoinitiator package further includes at least one photoinitiator selected from the group consisting of benzophenones, benzoin ethers, benzil ketals, α-hydroxyalkylphenones, and acylphosphine photoinitiators.

3. The overcoat composition according to claim 1, wherein the at least one phosphinoyl photoinitiator is selected from the group consisting of 2,4,6-trimethylbenzoyldiphenylphosphine oxide; 2,4,6-trimethylbenzoylethoxyphenylphosphine oxide; bis(2,4,6-trimethylbenzoyl)-phenylphosphine oxide; 2,4,6-trimethylbenzoylphenylphosphinic acid ethyl ester; diphenyl-(2,4,6-trimethylbenzoyl)phosphine oxide; and mixtures thereof; and the at least one alpha-hydroxy ketone photoinitiator is selected from the group consisting of; 1-(4-(2-hydroxyethoxy)phenyl)-2-hydroxy-2-methylpropan-1-one; 2-hydroxy-1-(4-(4-(2-hydroxy-2-methylpropionyl)-benzyl)-phenyl)-2-methylpropan-1-one; oligo(2-hydroxy-2-methyl-1-(4-(1-methylvinyl)phenyl)propanone); 2-hydroxy-2-methyl-1-phenyl-1-propanone; and mixtures thereof.

4. The overcoat composition according to claim 1, wherein a ratio of the at least one alpha-hydroxy ketone photoinitiator to the at least one phosphinoyl photoinitiator is from about 90:10 to about 10:90.

5. The overcoat composition according to claim 1, further comprising a polymerizable oligomer having a viscosity of from about 75 to about 7,500 cPs in an amount of up to about 30 weight percent of the overcoat composition.

6. The overcoat composition according to claim 1, wherein the overcoat composition is colorless prior to curing and upon exposure to radiation.

7. The overcoat composition according to claim 1, wherein the at least one monomer is selected from the group consisting of propoxylated neopentyl glycol diacrylate, diethylene glycol diacrylate, triethylene glycol diacrylate, hexanediol diacrylate, dipropyleneglycol diacrylate, tripropylene glycol diacrylate, alkoxylated neopentyl glycol diacrylate, isodecyl acrylate, tridecyl acrylate, isobornyl acrylate, propoxylated trimethylolpropane triacrylate, ethoxylated trimethylolpropane triacrylate, ditrimethylolpropanetetraacrylate, dipentaerythritolpentaacrylate, ethoxylated pentaerythritol tetraacrylate, isobornyl methacrylate, lauryl acrylate, lauryl methacrylate, isodecylmethacrylate, propoxylated glycerol triacrylate, lauryl acrylate, neopentyl glycol propoxylate methylether monoacrylate, caprolactone acrylate, 2-phenoxyethyl acrylate, isooctylacrylate, isooctylmethacrylate, butyl acrylate, and mixtures thereof.

8. The overcoat composition according to claim 1, wherein the at least one gellant is a mixture comprising:

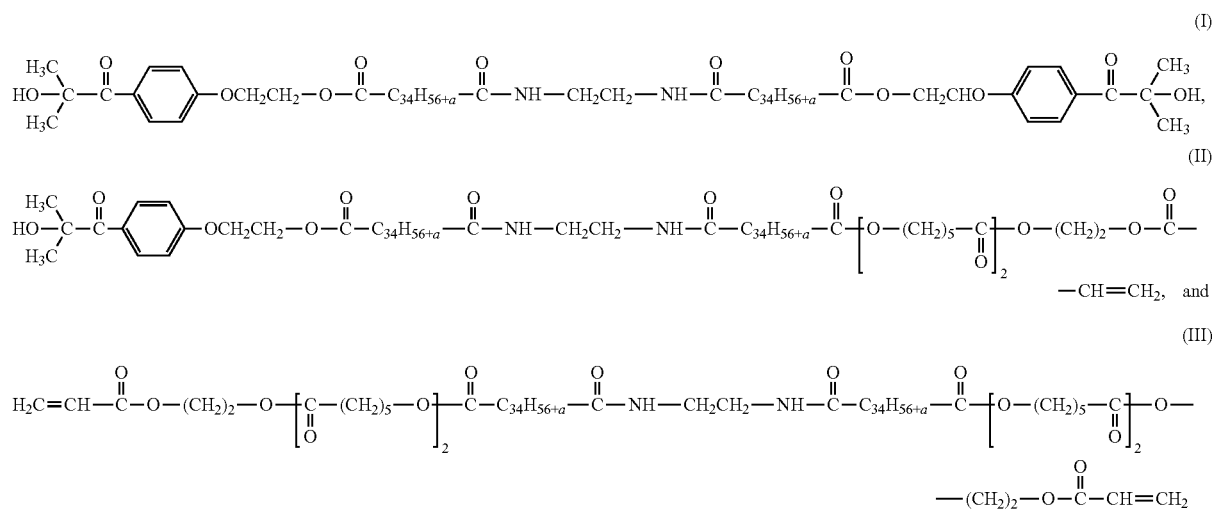

wherein —C$_{34}$H$_{56+a}$— represents a branched alkylene group which may include unsaturations and cyclic groups, wherein a is an integer of 0, 1, 2, 3, 4, 5, 6, 7, 8, 9, 10, 11, or 12.

9. The overcoat composition according to claim 8, wherein mixtures of gellants (I), (II) and (III) are in a molar ratio of about 1:2:1.

10. The overcoat composition according to claim 1, wherein the overcoat composition further includes at least one surfactant.

11. The overcoat composition according to claim 1, wherein the overcoat composition is substantially free of a colorant.

12. The overcoat composition according to claim 1, wherein the at least one gellant is present in an amount of from about 1 weight percent to about 50 weight percent of the overcoat composition, the at least one monomer is present in an amount of from about 20 weight percent to about 95 weight percent of the overcoat composition, and the photoinitiator package is present from about 0.5 weight percent to about 15 weight percent of the photoinitiator package.

13. An overcoat composition, comprising:
at least one gellant,
at least one monomer; and
a photoinitiator package,
wherein the overcoat composition exhibits a thermally reversible transition between a gel state and a liquid state when a temperature is varied above or below a gel point of the at least one gellant, wherein the overcoat composition further includes at least one reactive wax capable of participating in polymerization with the at least one monomer, wherein the photoinitiator package includes at least one alpha-hydroxy ketone photoinitiator and at least one phosphinoyl photoinitiator, wherein the at least one gellant comprises at least one curable amide gellant, and wherein the photoinitiator package includes at least one substantially non-yellowing photoinitiator;
wherein the CIE L*, a* and b* value differences, determined from uncoated images or substrates and the overcoat coated images or substrates, differs by an amount of no greater 2.12.

14. The overcoat composition according to claim 13, wherein the photoinitiator package further includes at least one photoinitiator selected from the group consisting of benzophenones, benzoin ethers, benzil ketals, α-hydroxyalkylphenones, and acylphosphine photoinitiators.

15. The overcoat composition according to claim 13, wherein the at least one phosphinoyl photoinitiator is selected from the group consisting of 2,4,6-trimethylbenzoyldiphenylphosphine oxide; 2,4,6-trimethylbenzoylethoxyphenylphosphine oxide; bis(2,4,6-trimethylbenzoyl)-phenylphosphine oxide; 2,4,6-trimethylbenzoylphenylphosphinic acid ethyl ester; diphenyl-(2,4,6-trimethylbenzoyl)phosphine oxide; and mixtures thereof; and the at least one alpha-hydroxy ketone photoinitiator is selected from the group consisting of 1-(4-(2-hydroxyethoxy)phenyl)-2-hydroxy-2-methylpropan-1-one; 2-hydroxy-1-(4-(4-(2-hydroxy-2-methylpropionyl)-benzyl)-phenyl)-2-methylpropan-1-one; oligo(2-hydroxy-2-methyl-1-(4-(1-methylvinyl)phenyl)propanone); 2-hydroxy-2-methyl-1-phenyl-1-propanone; and mixtures thereof.

16. The overcoat composition according to claim 13, wherein the overcoat composition is substantially free of a colorant.

17. The overcoat composition according to claim 13, wherein the at least one gellant is present in an amount of from about 1 weight percent to about 50 weight percent of the overcoat composition, the at least one monomer is present in an amount of from about 20 weight percent to about 95 weight percent of the overcoat composition, and the photoinitiator package is present from about 0.5 weight percent to about 15 weight percent of the photoinitiator package.

18. A process, comprising
forming an image on a substrate;
heating a substantially colorless overcoat composition above a gel point of at least one gellant of the overcoat composition;
coating the image with a heated overcoat composition such that the overcoat composition partially or completely covers the image and at least partially covers the substrate where no image is present;
allowing the overcoat composition to cool to below the gel point such that the viscosity of the overcoat composition increases; and
applying radiation to substantially cure the cooled overcoat composition, and
wherein the substantially cured overcoat composition is substantially colorless and does not substantially yellow upon curing, wherein the CIE L*, a* and b* value differences, determined from uncoated images or substrates and the overcoat coated images or substrates, differs by an amount of no greater 2.12, wherein the overcoat composition comprises the at least one gellant, wherein the at least one gellant comprises at least one curable amide gellant, at least one monomer, a photoinitiator package, wherein the photoinitiator package includes at least one alpha-hydroxy ketone photoinitiator and at least one phosphinoyl photoinitiator, and at least one reactive wax capable of participating in polymerization with the at least one monomer.

19. The process according to claim 18, wherein the at least one phosphinoyl photoinitiator is selected from the group consisting of 2,4,6-trimethylbenzoyldiphenylphosphine oxide; 2,4,6-trimethylbenzoylethoxyphenylphosphine oxide; bis(2,4,6-trimethylbenzoyl)-phenyl-phosphine oxide; diphenyl-(2,4,6-trimethylbenzoyl)phosphine oxide; 2,4,6-trimethylbenzoylphenylphosphinic acid ethyl ester; and mixtures thereof; and the at least one alpha-hydroxy ketone photoinitiator selected from the group consisting of 1-(4-(2 hydroxyethoxy)phenyl)-2-hydroxy-2-methylpropan-1-one; 2-hydroxy-1-(4-(4-(2-hydroxy-2-methylpropionyl)-benzyl)-phenyl)-2-methylpropan-1-one; oligo(2-hydroxy-2-methyl-1-(4-(1-methylvinyl)phenyl)propanone); 2-hydroxy-2-methyl-1-phenyl-1-propanone; and mixtures thereof.

20. The process according to claim 18, wherein the radiation is actinic radiation.

21. The process according to claim 18, wherein the overcoat composition is jetted at a temperature of from about 70° C. to about 100° C. and a viscosity of from about 5 to about 16 cPs onto the substrate, following the jetting the overcoat composition is cooled to a gel such that the viscosity is from about $10^3$ to about $10^7$ cPs, and after the overcoat composition is cooled to the gel, the overcoat composition is cured.

22. The overcoat composition according to claim 2, wherein the at least one further photoinitiator is selected from the group consisting of 2-methyl-1-(4-methylthio)phenyl-2-(4-morphorlinyl)-1-propanone; titanocenes; isopropylthioxanthone; 1-hydroxy-cyclohexylphenylketone; benzophenone; 2,4,6-trimethylbenzophenone; 4-methylbenzophenone; benzyl-dimethylketal; ethyl-4-dimethylaminobenzoate; 2-ethylhexyl-4-dimethylaminobenzoate; and mixtures thereof.

23. The overcoat composition according to claim 14, wherein the at least one further photoinitiator is selected from the group consisting of 2-methyl-1-(4-methylthio)phenyl-2-(4-morphorlinyl)-1-propanone; titanocenes; isopropylthioxanthone; 1-hydroxy-cyclohexylphenylketone; benzophenone; 2,4,6-trimethylbenzophenone; 4-methylbenzophenone; benzyl-dimethylketal; ethyl-4-dimethylaminobenzoate; 2-ethylhexyl-4-dimethylaminobenzoate; and mixtures thereof.

24. The process according to claim 18, wherein the photoinitiator package further includes at least one photoinitiator selected from the group consisting of 2-methyl-1-(4-methylthio)phenyl-2-(4-morphorlinyl)-1-propanone; titanocenes; isopropylthioxanthone; 1-hydroxy-cyclohexylphenylketone; benzophenone; 2,4,6-trimethylbenzophenone; 4-methylbenzophenone; benzyl-dimethylketal; ethyl-4-dimethylaminobenzoate; 2-ethylhexyl-4-dimethylaminobenzoate; and mixtures thereof.

* * * * *